Dec. 11, 1956  C. W. HURLEY  2,773,621
RESILIENT DISC CLOSURE
Filed Dec. 10, 1954
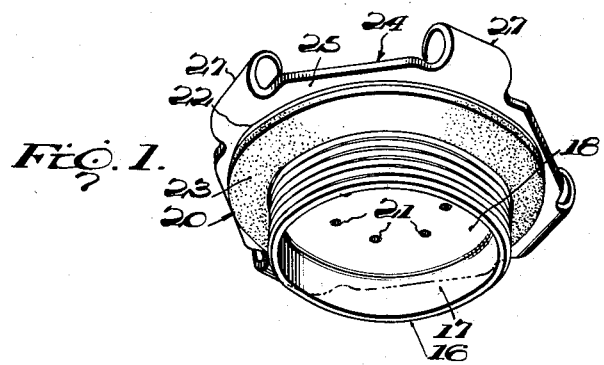
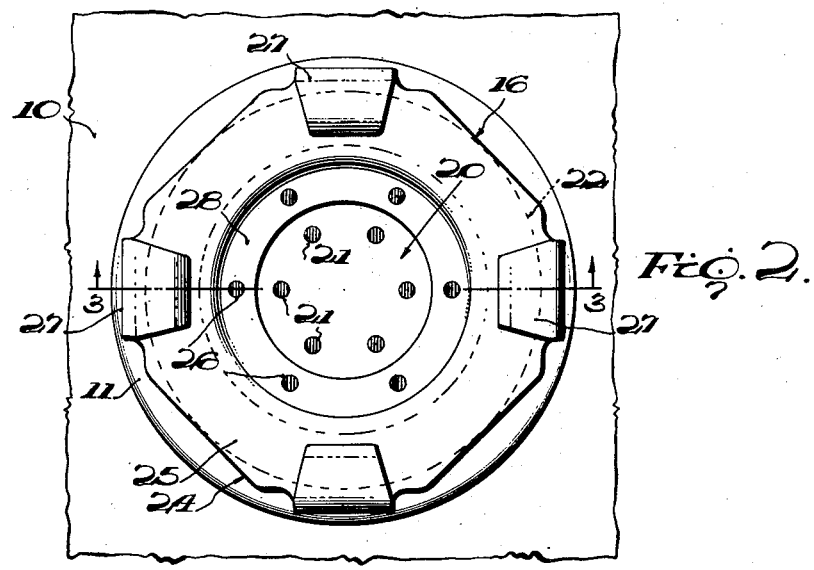
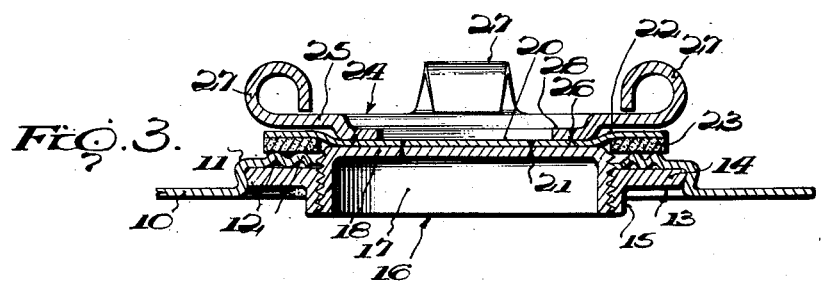
INVENTOR
Charles Warren Hurley.
BY
W. J. Eccleston
ATTORNEY

United States Patent Office 2,773,621
Patented Dec. 11, 1956

2,773,621

RESILIENT DISC CLOSURE

Charles Warren Hurley, Gaithersburg, Md., assignor to the United States of America as represented by the Secretary of the Army Application December 10, 1954, Serial No. 474,630

3 Claims. (Cl. 220—39)

The invention relates to container closures and more particularly to screw threaded or like closure plugs or caps for metal drums or the like.

In the conventional metal drum a threaded flange or sput defines an opening and is fixed in a generally annular embossment formed in the head or a wall of the drum. A sealing washer or gasket is carried by the closure plug or cap and is forced thereby into sealing engagement with a gasket seat on the sput or on the embossment. This structure includes a relatively rigid gasket seat on the cap or plug. The seal thereby provided makes no provision for "compression set" in the gasket after the seal has been maintained for relatively long periods. This "setting" is particularly prevalent in the synthetic rubbers or elastomers which are widely used at present and which are even necessary where the drum contains petroleum products which actively attack natural rubber.

For instance, current Federal Specifications for gasket materials used on 55 gallon drums permit a 40% compression set in a gasket after being compressed for 22 hours at 158° F. The closures for such drums must be able to withstand hydrostatic pressures up to 30 p. s. i. without leakage. The closure should be capable of withstanding up to 50 cycles of temperature fluctuation from —65° to 160° F. without leaking or "breathing". Additionally, the gasket material must survive temperature and solvent tests before it is universally acceptable. The synthetic rubbers able to pass such temperature and solvent tests inevitably have the undesirable compression set characteristics mentioned above.

Thus, to maintain an acceptable seal in spite of the compression set qualities of the gaskets, it has been suggested that the closures be modified to incorporate resilient means exerting a continuous resilient pressure on the gaskets.

The U. S. patents to Thomas H. Risk, Nos. 2,417,703 and 2,498,345 are examples of typical attempts to carry out this suggestion. The closures of both of these patents are three piece assemblies comprising a closure plug, a resilient sealing disc, and actuating means all rigidly connected together. In the first patent the connection is by rivets which are objectionable as they are susceptible of leakage therearound. The second patent connects the parts together by spot welding through the three thicknesses of material. This arrangement is objectionable in that it is very difficult to secure a sufficiently good bond when spot welding through three thicknesses of metal. Thus, the hammering to which the actuating means is subjected soon fractures the welds and causes separation of the parts.

With the foregoing in view, it is an object of the invention to provide an improved closure of the class described and which provides an extremely strong connection between the parts.

A further object is to provide a closure of the class described wherein the parts are so constructed and arranged that the spot welding connecting the parts together are so arranged that only two plies of metal are connected by each weld.

Other objects and advantages reside in the structure of the device, the structure of the several elements thereof, all of which will be readily apparent to those skilled in the art upon reference to the attached drawing in connection with the following specification wherein the invention is shown described and claimed.

In the drawing:

Fig. 1 is a perspective view of the invention;

Fig. 2 is a top plan view thereof; and

Fig. 3 is a sectional view of a seated closure taken substantially on the plane of the line 3—3 of Fig. 2;

Referring specifically to the drawing, wherein like reference characters designate like parts in all views, 10 designates a wall of a container having an embossment 11 formed about an opening therein. The upper surface of the embossment 11 is formed with a pair of concentric ribs 12 which form a gasket seat. A flange or sput 13 is fixedly mounted in the embossment 11 and comprises a horizontal flange 14 and an internally threaded vertical neck 15. As so far described, the structure is conventional and forms no part of my invention.

The closure according to the invention comprises an inverted cup-shaped plug 16 having flat top wall 18 and a cylindrical side wall 17 which is externally threaded for engagement with the neck 15 of the sput 13. A resilient sealing disc 20 is disposed atop the wall 18 and is suitably and rigidly secured thereto preferably by an annular series of spot welds 21. Such spot welds 21 are concentrically disposed about the axis of the plug 16. A marginal portion 22 of the disc 20 extends slightly outwardly of the plug 16. The undersurface of the rim of the marginal portion 22 has secured thereto an annular sealing gasket 23 which is located to overlie the gasket seat 12.

To actuate the closure, there has been provided a substantially rigid annulus 24 which is rigidly secured to the disc 20 in any suitable manner but preferably by an annular series of spot welds 26 which are concentrically disposed outwardly of the spot welds 21. The spot welds 26 are formed in an inner edge portion 28, the under surface of which rests on the upper surface of the sealing disc 20. The annulus 24 includes an annular outer edge 25 which is upwardly offset slightly relative to the disc 20 and edge portion 28 to provide a space permitting upward flexing of the marginal portion 22 of the disc 20, see Fig. 3. To actuate the closure there has been provided a series of upwardly directed tool-engaging lugs 27 which are preferably integral with the annular member 24.

In operation, the sealing disc 20 is normally of flat form. However, as the plug is turned to the seated position of Fig. 3, the marginal portion 22 of sealing disc 20 is flexed upwardly so that a continuous resilient pressure is exerted on the gasket 23. It should be understood, that the flexing of the marginal portion 22 is sufficient to permit the sealing disc 20 to compensate for any compression set in the gasket 23. At the same time, the particular arrangement secures the three parts together without requiring spot welding through three thicknesses of material. Thus, it is apparent that a substantially strong yet relatively simple structure has been achieved which effectively seals the container over long static periods and/or through periods of temperature fluctuations causing changes in the pressure within the container.

While I have shown and described what is now thought to be a preferred embodiment of the invention, it should be understood that the same is susceptible of other forms and expressions. Consequently, I do not limit myself to the precise structure shown and described hereinabove except as hereinafter claimed.

I claim:

1. In a screw threaded closure including a threaded closure body, a resilient sealing disc and actuating means for said closure; the improvement comprising said body having a circular central portion surrounded by an annular marginal portion, said disc having an annular resilient sealing portion disposed radially outwardly of said closure body, said actuating means being a rigid annulus, said annulus having an inner annular portion overlying said annular marginal portion of said body, an annular series of spot welds fixedly securing said inner annular portion of said annulus to said disc radially inwardly of said sealing portion, weld means fixedly securing said disc to said central portion of said body, and said annulus having an annular edge portion radially outwardly of said inner annular portion and in axially outwardly offset relation thereto and to said annular resilient sealing portion of said disc to permit axially outward flexing of the latter.

2. In a screw threaded closure including a threaded closure body, a resilient sealing disc and actuating means for said closure; the improvement comprising said body having a circular central portion surrounded by annular marginal portion, said disc having an annular resilient sealing portion disposed radially outwardly of said closure body, said actuating means being a rigid annulus, said annulus having an inner annular portion overlying said annular marginal portion of said body, means securing said inner annular portion of said annulus to said disc radially inwardly of said sealing portion, means rigidly securing said disc to said central portion of said body, and said annulus having an annular edge portion radially outwardly of said inner annular portion and in axially outwardly offset relation thereto and to said annular resilient sealing portion of said disc to permit axially outward flexing of the latter.

3. In a screw threaded closure including a threaded closure body, a resilient sealing disc and actuating means for said closure; the improvement comprising said body having a circular central portion surrounded by an annular marginal portion, said disc having an annular resilient sealing portion disposed radially outwardly of said closure body, said actuating means being a rigid annulus, said annulus having an inner annular portion overlying said annular marginal portion of said body, an annular series of spot welds fixedly securing said inner annular portion of said annulus to said disc radially inwardly of said sealing portion, and weld means fixedly securing said disc to said central portion of said body.

References Cited in the file of this patent

UNITED STATES PATENTS

| | | |
|---|---|---|
| 2,065,480 | Soper | Dec. 22, 1936 |
| 2,417,703 | Risk | Mar. 18, 1947 |
| 2,468,757 | Johnson | May 3, 1949 |
| 2,498,345 | Risk | Feb. 21, 1950 |
| 2,615,585 | Condit et al. | Nov. 4, 1952 |